United States Patent [19]

Dash et al.

[11] 4,370,570

[45] Jan. 25, 1983

[54] CIRCUIT FOR MINIMIZING RADIATION

[76] Inventors: Glen R. Dash, 16 Pierce Rd., Watertown, Mass. 02172; Isidor Straus, 2 Ridgewood Rd., Malden, Mass. 02148

[21] Appl. No.: 209,331

[22] Filed: Nov. 24, 1980

[51] Int. Cl.³ .......................... H03K 3/01; H03K 3/33
[52] U.S. Cl. .................................. 307/270; 307/300; 307/318
[58] Field of Search ................ 307/270, 269, 300, 318

[56] References Cited

U.S. PATENT DOCUMENTS 4,097,771 6/1978 Gollinger ............................. 307/269
4,245,168 1/1981 Waldron ............................. 307/270
4,291,240 9/1981 Rösler ............................... 307/269

Primary Examiner—Stanley D. Miller
Assistant Examiner—B. P. Davis
Attorney, Agent, or Firm—Wolf, Greenfield & Sacks

[57] ABSTRACT

A circuit is described for substantially reducing the level of radiation from another circuit such as a clock circuit that might be used in a computing device. By maintaining the current drawn by the clock driver from the power supply at a constant level, the amount of radiation is lowered. If all currents drawn can be controlled so as not to change as the clocking occurs, then radiation from the clock is essentially eliminated.

4 Claims, 3 Drawing Figures

CIRCUIT FOR MINIMIZING RADIATION

BACKGROUND OF THE INVENTION

The present invention relates in general to a circuit for minimizing radiation from another circuit. More particularly, there is described herein a circuit adapted for minimizing radiation from a clock circuit. The concepts of this invention are particularly applicable to such equipment as computing devices, calculators and the like.

In recent years there has been a substantial growth in the use of highly sophisticated computing equipment, both in the home and for industrial and commercial applications. This computing equipment, such as calculators, electronic games, computers, terminals, printers, etc., has become increasingly complex and now routinely uses computing rates exceeding 100,000 instructions per second. Along with this increase in speed has come an increased amount of unwanted electromagnetic radiation from these devices causing interference with radio and television communication. One of the objectives of the present invention is to provide a means which can be employed in combination with digital circuitry for reducing electromagnetic radiation from these computing devices. As described hereinafter, the source of this radiation is examined and then a means is devised as described herein for reducing the radiation from the source of radiation.

Circuits derive their name from the fact that in them electricity runs in loops through the components and often back into the power supply. Time varying currents in these circuits produce radiation in accordance with the following formula:

$$E = \eta c^2 \frac{\omega^2 a^2}{r} I_o \cos \omega t$$

$$\eta = \sqrt{\frac{\mu_o}{\epsilon_o}}$$

where:
$\omega$ = frequency in radians
$I_o$ = current, amps
$\mu_o$ = free space permeability
$\epsilon_o$ = free space dielectric constant
a = radius in meters
E = electrical field in volts per meter
r = measuring distance
c = speed of light in meters per second This formula represents the field generated by a small loop carrying sinusoidally varying current. At a given distance from the loop, the field strength is proportional to the magnitude of the current, the square of the loop radius, and the square of the frequency of radiation.

A computing device, such as a computer, electronic game, or calculator has hundreds of such loops. The signals in these loops are usually digital with a fundamental frequency of less than 100 Mhz. The loops that tend to radiate the most are the large radius loops which have signals that are periodic, have sharp edges and large current changes. The periodicity of the wave forms produce harmonics whose field strength, according to the above formula, increases with the square of the frequency. Both the radius of the loop and the magnitude of the current changes in the loop also effect the amount of radiation.

Of all the circuits in a computing device, the circuit with the highest frequency, sharpest edges and the highest current change is generally the clock circuit. The clock circuit furthermore is the heart of many digital devices. It provides the reference timing for the rest of the circuitry and often is also associated with the central processing unit of a computing device. Therefore, the clock circuit is one which needs to be designed in such a way so as to reduce or eliminate the radiation that is emanating from the circuit.

In comparison, most other circuits in the computing devices do not produce as much radiation as the clock driver. Also, these other circuits often conduct only random, uncorrelated signals that tend to produce broad band radiation with very low energy in relatively low interference potential. The clock driver, on the other hand, produces high energy, temporally correlated signals which have great interference potential. Furthermore, these signals are often distributed along many leads producing large amounts of total radiation.

Accordingly, one object of the present invention is to provide a circuit used in association with another circuit such as a clock circuit for reducing the radiation therefrom. As indicated previously this is particularly of concern in computing devices where a great many of these circuits are employed.

Another object of the present invention is to provide a circuit in accordance with the preceding object and which is relatively simple in construction.

SUMMARY OF THE INVENTION

To accomplish the foregoing and other objects of this invention, there is provided a circuit that is adapted to be used with another circuit, preferably a clock circuit for reducing the level of radiation from the clock circuit. By reference to the aforementioned formula, it can be seen that radiation can be reduced by controlling many different parameters. However, because of the function of a circuit such as the clock circuit, many of these parameters cannot be controlled as they relate to inherent characteristics of the circuit. In accordance with the present invention, it is the loop current that is controlled so that it is maintained substantially constant thereby lowering the amount of radiation. Actually, there may be considered to be at least three different currents associated with a typical clock driver. One of these currents is the one drawn by the clock driver from the power supply. Two other may be the clock lines generally consisting of two signals 180° out of phase. Other clock drivers may use other designs using from one to four clock lines in various phase relationships.

In a preferred embodiment described herein, instead of a simple shunt clock simply having an open collector gate with a load resister, there is provided a pair of semiconductor control devices such as bipolar transistors properly biased so as to be out of saturation and arranged to maintain a constant collector current irrespective of the voltage appearing at each collector. A diode arrangement including a Zener diode serves to clamp the voltage at the collectors of these transistors so as to maintain them out of saturation. Another Zener diode connected between the base and load resisters maintains a constant emitter current which in turn controls the collector current to a substantially constant value, again, irrespective of collector voltage swing. This circuit is described in further detail hereinafter.

DESCRIPTION OF THE DRAWING

Numerous other objects, features and advantages of the invention should now become apparent upon a reading of the following detailed description taken in conjunction with the accompanying drawing in which.

DETAILED DESCRIPTION

As explained, the objective of the present invention is to provide a circuit used with an electronic digital circuit such as a clock circuit for reducing the radiation from the clock circuit. This is accomplished in accordance with this invention by maintaining all currents drawn by the power supply by the clock driver at a constant level. This has the effect of lowering the amount of radiation emanating from the clock driver circuit or any other circuit with which the circuit of this invention is employed.

Figure 1:
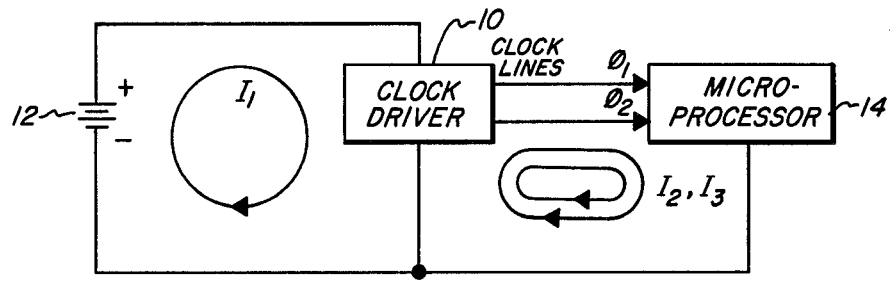
FIG. 1 schematically represents a clock driver and associated microprocesser showing loops between these components and the power supply depicted.

FIG. 1 shows a schematic diagram of a clock circuit including a clock driver 10, power supply 12 as represented by the battery symbol and microprocesser 14. It can be seen from FIG. 1 that there are in fact several circuit loops which relate to the clock driver 10. The first loop is indicated as loop $I_1$. This loop represents a change of current drawn by the clock driver from the power supply $1_2$. The other two loops $I_2$ and $I_3$ are representative of the output clock lines from the clock driver to the utilization circuit which in this case is a microprocesser 14. These clock signals are typically 180° out of phase. In other arrangements other clock lines may be employed in various phase relationships.

The invention that is described herein has its purpose to maintain all three of these currents $I_1$, $I_2$ and $I_3$ at a constant level thereby lowering the amount of radiation from the clock driver. If the currents I1, $I_2$ and $I_3$ do not change, then radiation from the clock is virtually eliminated.

Figure 2:
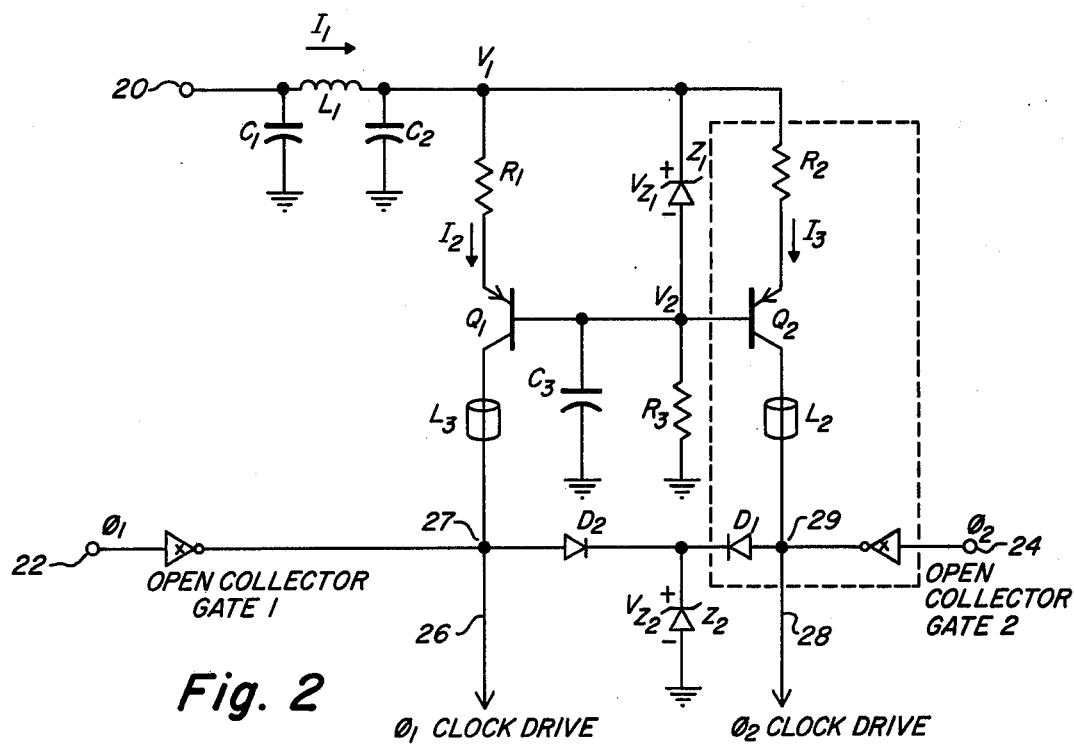
FIG. 2 shows a preferred embodiment for the circuit of this invention for minimizing the radiation from the clock circuit.
Figure 3:
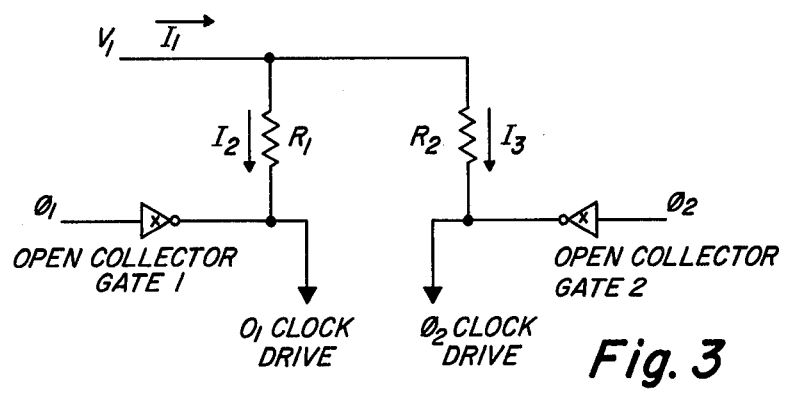
FIG. 3 shows a prior art simple shunt clock circuit.

FIG. 3 shows a preferred embodiment for clock circuitry employing the principles of this invention for maintaining current values at constant levels. FIG. 2 does not specifically show the power supply but it is understood that the power supply couples to the input terminal 20. The currents $I_2$ and $I_3$ described in connection with FIG. 1, are shown in FIG. 2 as the currents flowing through the respective resistors $R_1$ and $R_2$. Input control signals appear at terminals 22 and 24 coupling respectively to the open collector gates 1 and 2. The output clock drive signals of opposite phase appear on the output lines 26 and 28. These lines couple respectively to the nodes 27 and 29. The output of gate 1 couples to node 27 and the output of gate 2 couples to node 29.

In FIG. 2 there is provided a filter comprising capacitors $C_1$ and $C_2$ along with inductor $L_1$. This is a common filter which is used to maintain the current I1 relatively constant. The currents $I_2$ and $I_3$ flow into the emitter of respective transistors $Q_1$ and $Q_2$.

Also included in the circuitry are two Zener diodes $Z_1$ and $Z_2$ along with diodes $D_1$ and $D_2$. In FIG. 2 the voltage at the anode of Zener diode $Z_1$ is expressed as $V_1$ volts. This Zener diode maintains the voltage at the base of the transistors $Q_1$ and $Q_2$ at $V_1 - V_{z1} = V_2$.

As long as both transistors are out of saturation, there is a constant current flowing thru resistors $R_1$ and $R_2$. These currents are expressed by the following equations:

$$I_2 = \frac{V_{Z1} - .6 \text{ volt}}{R_1} \quad (1)$$

$$I_3 = \frac{V_{Z1} - .6 \text{ volt}}{R_2} \quad (2)$$

It is noted that the currents $I_2$ and $I_3$ are independent of the voltage at either of the collectors of transistors $Q_1$ or $Q_2$. The total current into the clock circuit is then:

$$I_1 = I_2 + I_3 \quad (3)$$

Equation (3) is fulfilled as long as transistors $Q_1$ and $Q_2$ remain out of saturation. These transistors are kept out of saturation by means of diodes $D_1$ and $D_2$ along with Zener diode $Z_2$. These components clamp the voltage at the collectors of transistors $Q_1$ and $Q_2$ at $V_{Z2} + 0.6$ volts. The currents $I_1$, $I_2$ and $I_3$ will remain constant irrespective of changes of the collector voltage on these transistors as long as the following condition is satisfied:

$$V_{Z2} + .6 \text{ volt} \leq V_1 - V_{Z1} \quad (4)$$

In equation (4) the quantity on the left hand side of the equation represents the voltage at node 27 or 29 while the quantity on the right hand side of the equation represents the voltage at the base of the transistors $Q_1$ and $Q_2$. The voltage at the collectors of transistors $Q_1$ and $Q_2$ is able to be varied but the currents in the clock circuit, namely currents $I_1$, $I_2$ and $I_3$ remain constant and thus radiation from the clock circuit is substantially reduced. Ferrite beads $L_2$ and $L_3$ may also be provided for additionally maintaining the current constants.

Input signals at the terminals 22 and 24 cause the open collector gates 1 and 2 to change the voltages at the collectors of transistors $Q_1$ and $Q_2$. The gate 1 controls the voltage at the collector of transistor $Q_1$ while the gate 2 controls the voltage at the collector of transistor $Q_2$. It is this voltage change that becomes the clock drive and serves as timing for the rest of the computing device circuitry. The clock drive is by way of lines 26 and 28. Conventionally, these lines have signals that are 180° out of phase although such a phase relationship is not required for the circuit of FIG. 2 to perform its function.

If a computing device requires more clock drives at different phases, this may be accomplished by repeating the circuit shown in the dotted lines in FIG. 2 as many times as is required to meet the needs of the computing device.

The advantages of the circuit of FIG. 2 over conventional clock drives can be realized by considering the conventional circuit shown in FIG. 3. In FIG. 3 the clock waveform is taken at the output of either gate 1 or gate 2. Again, in this common circuit, these gates are open collector gates. In this circuit, the currents $I_2$ and $I_3$ flow thru respective resistors $R_1$ and $R_2$ coupled from the supply voltage $V_1$. Currents $I_2$ and $I_3$ change as the output of the open collector gates pull the resistors low and therefrom cause much more radiation than with the circuit of this invention. Furthermore, the rise time of the clockwave form is slow when the clockdrive waveform is rising, especially when the voltage of that waveform approaches the supply voltage $V_1$. Since this rise time is often critical, the resistors $R_1$ and $R_2$ of FIG. 3 must be small to provide enough current to pull the clockwave form all the way up to the voltage $V_1$, within the required period of time.

On the other hand, the circuit of the present invention such as shown in FIG. 2 does not have such disadvantages. Since the current supplied by the transistors $Q_1$ and $Q_2$ is constant, the necessary rise time can be achieved with much less current. Therefore the circuit of FIG. 2 provides a power savings, and allows the rise time to be easily controlled by changing the value of resistors $R_1$ and $R_2$ or by adding a capacitor from the output of the open collector gates to ground. Therefore the circuit of FIG. 2 minimizes radiation, power disipation and cost.

What is claimed is:

1. A clock driver circuit comprising;
   a pair of bipolar transistors each having base, emitter and collector electrodes,
   means coupling the base electrodes at common base node,
   a pair of current determining resistors one associated with each bipolar transistor,
   means defining an input power terminal to which a DC voltage is applied,
   passive conducting means coupling the power terminal to each resistor with the resistor coupled in turn to one of the emitter and collector electrodes,
   first and second gates having outputs coupling respectively to define first and second clock drive lines,
   passive conductive means coupling the other of the emitter and collector electrodes to the respective first and second clock drive lines,
   a first Zener diode and a pair of diodes coupled respectively to the gate outputs,
   and a second Zener diode coupled from the common base node to a common connection of the resistors.
2. A clock driver circuit as set forth in claim 1 wherein the gates are open collector gates.
3. A clock driver circuit as set forth in claim 1 including a filter circuit coupling from the power terminal to the resistors.
4. A clock driver circuit as set forth in claim 3 wherein the filter circuit includes a pair of capacitors and an inductor.

* * * * *